United States Patent [19]

Imataki

[11] Patent Number: 5,075,060
[45] Date of Patent: Dec. 24, 1991

[54] PROCESS FOR PRODUCING A SUBSTRATE SHEET FOR AN OPTICAL RECORDING MEDIUM

[75] Inventor: Hiroyuki Imataki, Tokyo, Japan

[73] Assignee: Canon Kabushiki Kaisha, Tokyo, Japan

[21] Appl. No.: 435,242

[22] Filed: Nov. 13, 1989

[30] Foreign Application Priority Data

Nov. 16, 1988 [JP] Japan ................................ 63-289829
May 30, 1989 [JP] Japan ................................ 63-138814
Jun. 2, 1989 [JP] Japan ................................ 1-141392

[51] Int. Cl.⁵ ...................... B29C 47/00; B29C 47/88; B29C 71/02
[52] U.S. Cl. .................... 264/167; 264/1.3; 264/106; 264/210.2; 264/211.12
[58] Field of Search ............. 264/1.3, 106, 167, 210.2, 264/211.12, 234, 284, 345, 348

[56] References Cited

U.S. PATENT DOCUMENTS 4,543,225 9/1985 Beaujean ........................... 264/167
4,556,378 12/1985 Nyfeler et al. .................... 425/143
4,790,893 12/1988 Watkins ........................... 264/1.3 X

FOREIGN PATENT DOCUMENTS 1960761 6/1970 Fed. Rep. of Germany ... 264/210.2

Primary Examiner—Leo B. Tentoni
Attorney, Agent, or Firm—Fitzpatrick, Cella, Harper & Scinto

[57] ABSTRACT

A process for producing an optical recording medium in a sheet form, including the steps of: melt-extruding a resin to form a resin sheet; and passing under pressure the resin sheet in a substantially melted state between a first heated roller having a predetermined unevenness pattern and a second heated roller disposed opposite thereto, thereby to transfer the unevenness pattern to a surface of the resin sheet.

7 Claims, 4 Drawing Sheets under heating; and that the resin sheet softened under heating has a certain elasticity, and is disadvantageous to precise transfer of minute unevenness pre-format.

The process for producing an optical recording medium substrate in a sheet form according to the present invention is based on the above discovery and comprises: melt-extruding a resin to form a resin sheet; and passing under pressure the resin sheet in a substantially melted state between a first heated roller having a predetermined unevenness pattern and a second heated roller disposed opposite thereto, thereby to transfer the unevenness pattern to a surface of the resin sheet.

The present invention also provides an apparatus for producing an optical recording medium in a sheet form, comprising:

means for melt-extruding a resin to form a resin sheet;

a first heated roller having a predetermined unevenness pattern for transferring the unevenness pattern to the resin sheet; and a second heated roller disposed opposite to the first roller, wherein the resin sheet in a substantially melted state is passed between the first and second rollers under pressure to transfer said unevenness pattern to a surface of the resin sheet.

Incidentally, there has been known a process for producing an embossed film wherein an unevenness pattern not requiring a precision of the same order of microns is formed on a resin sheet (Japanese Patent Publication (JP-B, KOKOKU) No. 20694/1988). However, even when such an embossing method is intended to be applied to the continuous production of an optical recording medium substrate, it cannot solve the above-mentioned problems encountered in the conventional process for continuously producing an optical recording medium substrate.

More specifically, Japanese Patent Publication No. 20694/1988 discloses a production process of an embossed film using a pressing roller and a cooling roller, wherein a softened thermoplastic resin film is caused to closely contact the pressing roller engraved with an unevenness pattern thereby to form an embossing pattern on the film surface, and then, without peeling the film from the pressing roller, the film is pressed and rapidly cooled by the cooling roller thereby to fix the embossing pattern to the film.

However, even when this method is as such applied to the production of an optical recording medium substrate, and the melted resin is simply supplied to a roller (i.e., pre-format roller) having a pre-format pattern so that it closely contact the roller, it is difficult to precisely transfer the minute and regular pre-format pattern to a substrate although such precise transfer is particularly important in the optical recording medium substrate. Further, in the above-mentioned method, since the resin is pressed by the pressing roller and the cooling roller, and is rapidly cooled simultaneously, the resin is hardened and is not sufficiently pressed in the pre-format pattern of the pre-format roller. As a result, the pre-format is not precisely transferred to the resin and there occurs a problem such that the resin sheet is shrunk due to the rapid cooling.

On the contrary, in the present invention, since a melted resin sheet is sandwiched between a heated roller with a pre-format and a heated pressing roller under pressure, it is possible to keep the resin sheet in a state such that it has a low viscosity and has substantially no

PROCESS FOR PRODUCING A SUBSTRATE SHEET FOR AN OPTICAL RECORDING MEDIUM

FIELD OF THE INVENTION AND RELATED ART

The present invention relates to a process and an apparatus for producing a substrate for an optical recording medium wherein data (or information) is recorded and/or reproduced.

Hitherto, optical recording media generally comprise a substrate, an optical recording layer disposed thereon, and a protective member laminated on the optical recording layer. The substrate is generally transparent to a light for recording and/or reproduction such as semiconductor laser. In the above-mentioned substrate for an optical recording medium (hereinafter, sometimes simply referred to as "substrate"), a predetermined minute unevenness pattern (hereinafter, referred to as "pre-format") of the same order of microns such as tracking groove and address information (or address data) pit is generally provided preliminarily.

As the method of forming such a pre-format, there have been known injection process, compression process, 2P (photopolymerization) process, casting (or cast molding) process, etc. However, it is difficult for these processes to satisfy good productivity and low production cost. In order to satisfy both of these, Japanese Laid-Open Patent Application (JP-A, KOKAI) No. 86721/1981 discloses a process for producing a data recording disk wherein a sheet of thermoplastic resin is heated by an infrared lamp in a heating chamber, and is provided with an unevenness pattern corresponding to a signal by means of a pair of shaping rollers.

This method is excellent in productivity since it may continuously treat a sheet in a roll form with the shaping rollers However, according to my investigation, when such a process is applied to the transfer of minute pre-format, it cannot provide a substrate having a pre-format with high precision. More specifically, the above-mentioned process has the following problems.

(1) When the above-mentioned sheet is heated and a pre-format pattern is transferred thereto by means of shaping rollers, a substrate having a pre-format with high precision is not obtained.

(2) When the heated and softened resin sheet is pressed by the shaping rollers, minute unevenness pre-format is not precisely transferred to the resin sheet. Particularly, the variation in depth of the pre-format (or shaping stability, exceeds 10% with respect to the direction of the extrusion.

SUMMARY OF THE INVENTION

An object of the present invention is, in view of the above-mentioned problems, to provide an optical recording medium substrate to which a pre-format pattern of the order of microns has precisely been transferred, with high productivity by utilizing an embossing technique.

Another object of the present invention is to obtain an optical recording medium substrate which has a uniform thickness and is free of deformation or distortion such as torsion.

As a result of the investigations, I have found that, in the prior art, since the once shaped sheet is again heated, the sheet is deformed or distorted on the basis of the strain provided at the time of shaping of the sheet, e.g., strain due to stretching, when the sheet is softened elasticity, until the resin sheet is shaped. As a result, the resin sheet is surely pressed even in the concavities of the pre-format pattern of the pre-format roller (i.e., stamper), thereby to provide an optical recording medium substrate in a sheet form to which the pre-format pattern of the pre-format roller has precisely been transferred.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
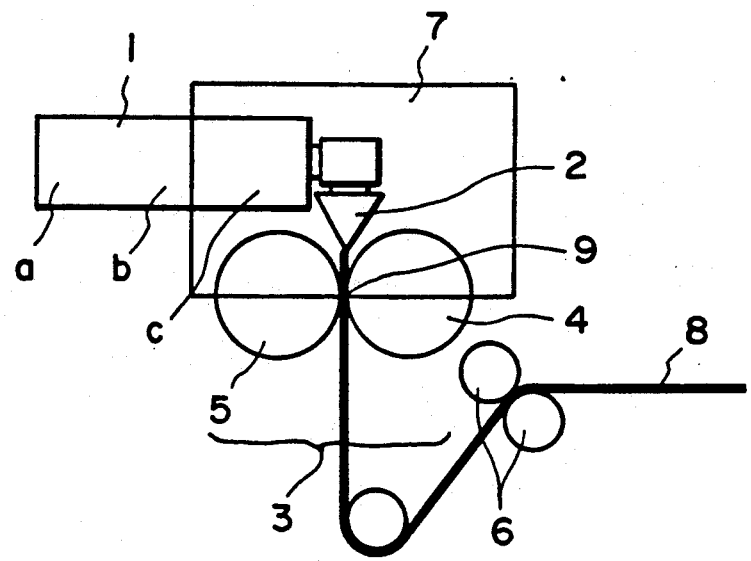
FIGS. 1 and 2 are schematic sectional views each showing an embodiment of the present invention.

Referring to FIG. 1, reference numeral 1 denotes an extruder, numeral 2 denotes a T-die (or T-shaped die), and numeral 3 denotes a pressure shaping unit comprising two rollers 4 and 5. The surface of at least one of these rollers 4 and 5 has an unevenness pattern, e.g., a pre-format pattern such as are corresponding to a groove for providing a signal for tracking, and a pit for providing a signal for address, etc. (hereinafter, such a roller having a pre-format pattern is referred to as "pre-format roller").

The term "die" used herein refers to a device having a through-hole with a predetermined shape. The die imparts a material such as resin by passing the material through it (i.e., by extrusion).

In the present invention, the die may preferably be one having a circular or substantially circular opening as an inlet for a material, and having an orifice or opening in the form of a slit as an outlet for the material. Specific examples of such a die may include: the above-mentioned T-die having a through-hole with a planar shape like "T"; a so-called "fish tail die" having a through-hole with a planar shape like a fish tail; a so-called "coat hanger die" having a through-hole with a planar shape like a coat hanger.

Hereinbelow, an embodiment of the process for producing an optical recording medium substrate in a sheet form according to the present invention is specifically described.

Referring to FIG. 1, resin pellets (not shown) are charged into the extruder 1, and are melted or fused by heating in the barrel of the extruder 1. The melted resin is then pressurized by means of a screw (not shown) disposed in the extruder 1 and shaped into a sheet form 8 by means of a T-die 2. At this time, the resin may preferably be in a state wherein the resin is completely or almost melted. For example, in the case of a polycarbonate resin, the temperature of the resin disposed in the vicinity of the T-die 2 may preferably be sufficiently higher than the melting point thereof. More specifically, the resin may preferably be heated up to a temperature of about 280° C.–330° C., more preferably about 300° C.–320° C., in the case of the polycarbonate resin.

Then, the resin in the form of a sheet 8 is continuously extruded from the T-die 2. It is preferred to dispose the T-die 2 so that the sheet 8 of the thus melted resin is extruded toward the clearance between the rollers 4 and 5 constituting the pressure shaping unit 3. Further, it is preferred to dispose the T-die 2 and the rollers 4 and 5 so that the distance from the tip of the T-die 2 to the nip point 9 between the rollers 4 and 5 is 100 mm or shorter, more preferably 60 mm or shorter, so that the resin does not substantially harden or solidify until it contacts the roller. The ambient temperature around, the above-mentioned distance between the T-die 2 and the nip point 9 between the rollers may preferably be 60° C. or higher, more preferably 75° C. or higher. The term "hardening" of the resin used herein also includes a state wherein the viscosity of its surface portion is substantially increased so as to have an elasticity.

The resin sheet 9 extruded toward the clearance between the rollers 4 and 5 is then sandwiched under pressure between the pre-format roller 5 and pressing roller 4 which are heated up to a predetermined temperature, whereby the unevenness pre-format pattern of the pre-format roller is transferred to the resin sheet. In the present invention, however, either one or both of the rollers 4 and 5 may be pre-format rollers.

In the present invention, it is preferred to retain the pre-format roller 5 at a temperature such that the resin used is not substantially hardened on the roller. More specifically, the pre-format roller 5 may preferably be heated so that the surface temperature thereof is higher than the glass transition point of the resin, and is not higher than the melting point (mp) thereof. The surface temperature of the pre-format roller may more preferably be in the range of from the melting point to (mp - 40° C.), particularly in the range of from the melting point to (mp - 20° C.). For example, in the case of a polycarbonate resin, the surface temperature of the pre-format roller 5 may preferably be 160° C.–220° C., more preferably 170° C.–200° C.

Thus, at the time at which the resin sheet 8 is sandwiched under pressure between the pre-format roller 5 and the pressing roller 4 so as to transfer the pre-format to the resin sheet, the resin sheet may be kept in a high-temperature state so that the resin sheet does not substantially harden, have a low viscosity and does not substantially have an elasticity even when it contacts the pre-format roller 5. As a result, the resin is surely pressed even in the concavities of the pre-format of the pre-format roller (i.e., stamper) 5, whereby the pre-format is precisely transferred to the resin sheet 8.

Further, when the resin sheet is kept in the above-mentioned temperature range, the melted resin is not cooled rapidly, and therefore strain or distortion such as shrinkage does not substantially occur. The temperature of the pressing roller 4 constituting the pressure shaping unit 3 may preferably be the same as, or somewhat lower than that of the pre-format roller 5. More specifically, the temperature of the pressing roller 4 may preferably be lower than that of the pre-format roller by 0.3° C.-2° C., more preferably 0.5° C.-1° C.

The temperatures of these rollers 4 and 5 may be controlled, e.g., by electrically heating the roller by use of a heater disposed therein, or by circulating a heat transfer medium in the central portion of the roller.

Figure 3:
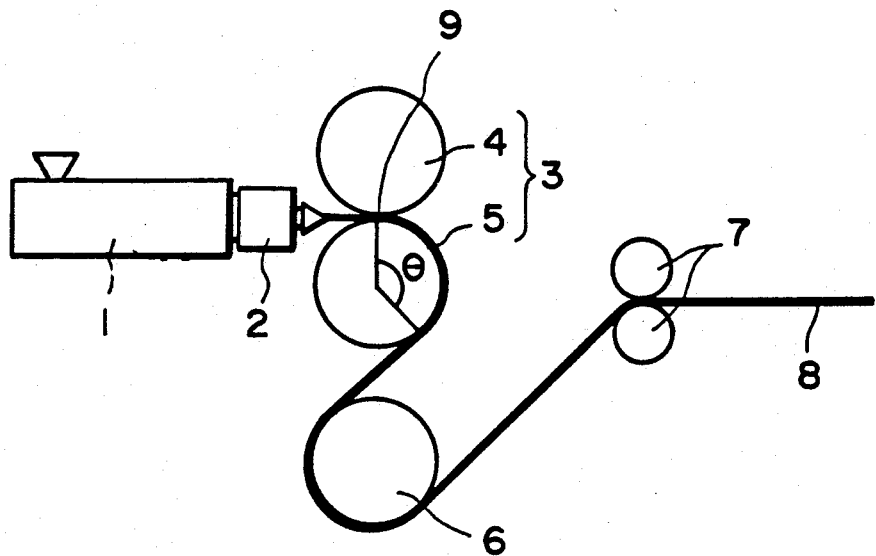
FIGS. 3 and 4 are schematic sectional views each showing another embodiment of the present invention wherein a resin sheet is caused to closely contact a portion of the round peripheral surface of a roller having a pre-format along with a certain arc thereof.
Figure 4:
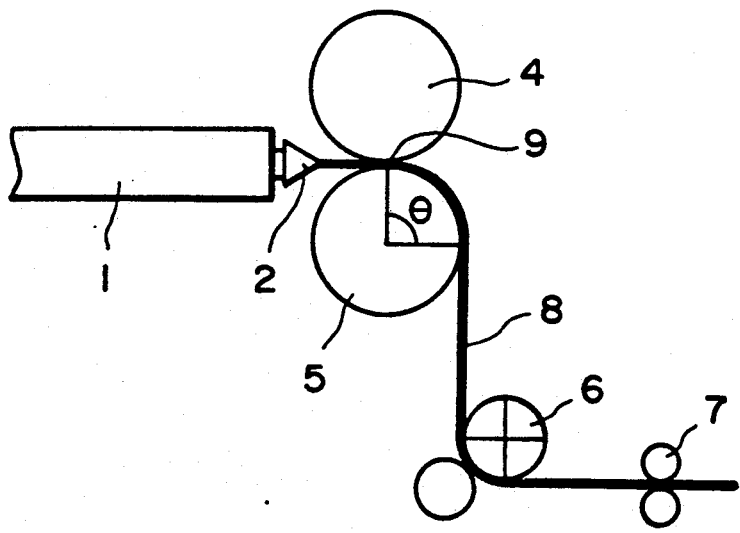

In the present invention, in order to further enhance the transfer precision, it is preferred to cause the sheet 8 of the melted resin extruded from the die 2 to closely contact the pre-format roller 5 so that it continuously contacts a predetermined portion (or arc) of the round peripheral surface of the pre-format roller 5 without peeling the resin sheet 8 from the pre-format roller 5, even after the resin sheet 8 is sandwiched under pressure between the heated pre-format roller 5 and pressing roller 4, as shown in FIG. 3 or 4.

More specifically, in such an embodiment, the resin is surely filled into concavities of the unevenness pre-format, and, while the resin sheet 8 is continuously caused to closely contact the peripheral surface of the pre-format roller 5, the resin sheet 8 is gradually cooled on the basis of the ambient atmosphere, whereby the pre-format pattern transferred to the resin sheet 8 is fixed while the resin sheet 8 is caused to closely contact the pre-format roller 5. As a result, the pre-format pattern may more precisely be transferred to the resin sheet 8. Further, strain such as shrinkage is prevented from occurring in the resin sheet, and irregularity in shaping with respect to the direction of the resin extrusion may be suppressed (i.e., the shaping stability may be enhanced). In the present invention, it is preferred to reduce the shaping irregularity (or shaping stability) as described hereinafter to 10% or below, more preferably 5% or below, particularly preferably 3% or below, with respect to the direction of the extrusion of the resin sheet 8.

In the above-mentioned embodiment as shown in FIG. 4, when the angle formed by two radii (i.e., a radius joining the center (or axis) of the pre-format roller 5 and the nip point 9 between the rollers 4 and 5, and a radius joining the center of the pre-format roller 5 and a peeling point at which the resin sheet 8 is peeled or separated from the roller 5, is represented by "$\theta$"), the resin sheet 8 may preferably be caused to closely contact a portion of the peripheral surface of the pre-format roller 5 so that the $\theta$ is 70 degrees or larger and 300 degrees or smaller, more preferably 90 degrees or larger and 270 degrees or smaller. In such a case, a precise pre-format may desirably be formed on the resin sheet 8 since the resin sheet 8 to which the unevenness pattern has been transferred is gradually cooled so as to prevent strain in the resin sheet 8.

Further, in the present invention, after the sheet 8 of the melted resin is sandwiched under pressure between the heated pressing roller 4 and the pre-format roller 5 having the unevenness pre-format pattern, the resin sheet 8 may be heat-treated as desired while being continuously caused to closely contact the peripheral surface of the pre-format roller 5. More specifically, even after the resin sheet 8 in the melted state extruded from the T-die 2 is shaped by the pre-format roller 5, the resin sheet 8 may be heat-treated, e.g., by regulating the temperature of the ambient atmosphere, while the resin sheet is caused to closely contact the roller 5 without rapidly cooling the resin sheet. Thus, the residual strain which can occur at the time of shaping may be removed and birefringence is suppressed. Particularly, the birefringence in the both end (or edge) portions of the resin sheet 8 which has been extruded from the end portions of the die slit and supplied with considerable stress, may be suppressed, whereby the birefringence in the resin sheet 8 may uniformly be reduced.

At present, e.g., in the case of an optical magnetic disk, the birefringence of an optical recording medium substrate is generally required to be 20 nm or smaller corresponding to a single path. In view of the birefringence, polymethyl methacrylate (PMMA) used as an optical resin may sufficiently satisfy the above-mentioned requirement, but it is generally inferior to polycarbonate (PC) in heat-resistance and impact resistance.

In such a viewpoint, Japanese Laid-Open Patent Application No. 140817/1987 discloses a process for producing a polycarbonate sheet for an optical disk substrate, wherein a polycarbonate (PC) resin excellent in heat-resistance and impact resistance is used and birefringence is suppressed.

However, in this method, the resin sheet is heat-treated by sandwiching it between stainless steel plates provided with mirror surfaces, and pressurization (0.1-30 kg/cm$^2$) is required. Accordingly, this method requires a complicated production apparatus and does not treat the resin at good productivity. Further, since a resin is extruded through a T-die to be stretched and hardened into a resin sheet form, the resultant residual strain is great and therefore this method requires heating of 160° C.-180° C. and pressing by the stainless steel plates. However, the temperature of 160° C.-180° C. is considerably high temperature in view of the melting point of the polycarbonate (220° C.-230° C.). Accordingly, if an unevenness pre-format is formed on the resin sheet, the unevenness can be destroyed.

On the contrary, according to the above-mentioned process of the present invention, the pattern of a pre-format roller 5 may be transferred to a resin sheet 8 extremely precisely, an unevenness pre-format may continuously be formed on the resin sheet 8, and heat-treatment may also be conducted continuously. As a result, an optical recording medium substrate in a sheet form wherein the birefringence is reduced may be provided at high productivity.

Figure 5:
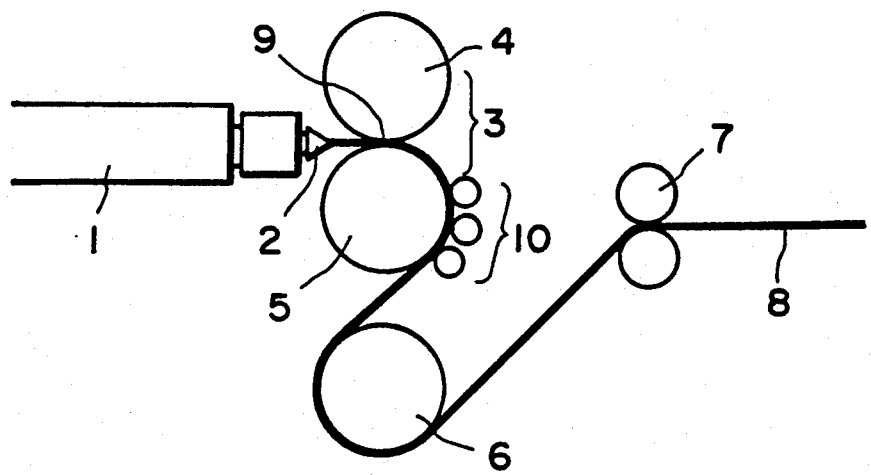
FIGS. 5, 6 and 7 are schematic sectional views each showing a further embodiment of the present invention wherein a resin sheet is heat-treated while being caused to closely contact a portion of the round peripheral surface of a pre-format roller along with a certain arc thereof.
Figure 6:
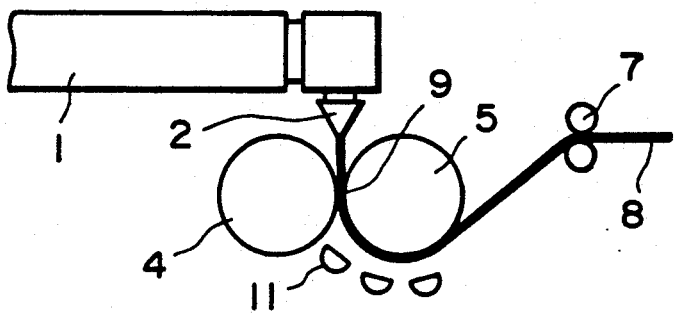
Figure 7:
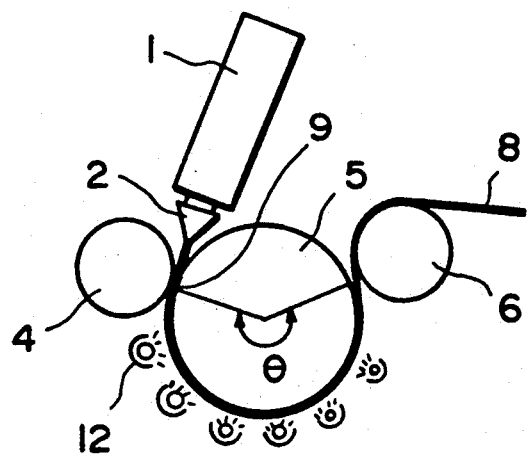

In the present invention, the resin sheet 8 may be heat-treated, e.g., by controlling an atmosphere around the pre-format roller 5. More specifically, as shown in FIG. 5, 6 or 7, temperature control means such as a plurality of rollers 10 (FIG. 5), blowers 11 (FIG. 6) or infrared lamps 12 (FIG. 7) which are controlled so as to provide a predetermined temperature may be disposed opposite to the peripheral surface of the pre-format roller 5, and the resin sheet 8 may be passed between the roller 5 and these temperature control means. Alternatively, such temperature control may be conducted by means of a tunnel oven or an infrared lamp, or by dipping the resin sheet in a solvent of which temperature is controlled.

In the present invention, it is preferred to heat-treat the resin sheet under a condition such that the resin sheet is cooled to the glass transition point thereof at a cooling rate of 5° C./sec or below, more preferably 3° C./sec, particularly preferably 2° C./sec. Thus, when the resin sheet is gradually cooled at such a cooling rate, an optical recording medium substrate in a sheet form having low birefringence may be obtained. Particularly, an embodiment as shown in FIG. 7, wherein the resin sheet after the sandwiching is caused to closely contact the pre-format roller 5 for a longer period of time, is advantageous since the cooling rate may easily be controlled finely.

As the process for producing the pre-format roller usable in the present invention, there may be used one wherein the surface of a roller body is directly cut by using a diamond cutting tool, etc.; one wherein a photoresist is applied onto a roller, and the resultant roller is subjected to patterning and etching by a photolithographic process, thereby to process the roller; one wherein a stamper in a thin sheet form is prepared and then wound about a roller; etc.

The material constituting the pre-format roller 5, or other pressing rollers 4 and 6 may be a metal, a semiconductor, a dielectric, an alloy, etc. Particularly, the pre-format roller 5 may preferably comprise a material capable of being provided with a mirror surface, such as Al, super hard alloy, mold steel (e.g., Maraging steel). Chromium steel (Cr steel) capable of easily being provided a mirror surface is particularly preferred.

Referring to FIG. 1, a draw roller (or draw-off roller) 6 is important in views of the continuous shaping. The draw roller 6 may be driven in synchronism with the movement of the rollers 4 and 5 constituting the pressure shaping unit 3. More specifically, these two types of rollers may preferably be driven so that the peripheral speed of the draw roller 6 is equal to that of the rollers 4 and/or 5, and a stress such as that for stretching is not substantially applied to the resin sheet 8 between these two types of rollers. In such a manner, optical anisotropy may be prevented from occurring in the interior of the resin sheet 8.

The thickness of the optical recording medium substrate 8 in a sheet form may be determined by the gap or clearance between the rollers 4 and 5 constituting the pressure shaping unit 3, the degree of opening of the T-die 2 lip, the drawdown ratio between the extrusion speed and pulling speed, i.e., the degree of stretching.

In general, the degree of opening of the T-die lip is larger than an intended thickness of a sheet by 20%-40%, and the drawdown ratio is increased so as to regulate the sheet thickness. In the present invention, however, the drawdown ratio may preferably be larger than the intended thickness by 0%-20%, in order to prevent optical anisotropy based on the strain due to drawdown.

Further, in order to prevent variation in sheet thickness or strain in the thickness direction, the difference between the degree of opening of the die lip and the gap between rollers constituting the pressure shaping unit 3 may preferably be as small as possible. Such a difference may preferably be 30% or smaller, more preferably 15% or smaller, based on the gap between the rollers.

The material for the resin sheet 8 used in the present invention may be any resin as long as it is a thermoplastic resin, but may preferably be a resin having a high optical transmittance. Preferred examples of such a resin may include: polycarbonate resins, acrylic resins, styrene resins, vinyl chloride resins, allyl resins, TPX resin (polymethyl pentene), etc.

In the present invention, it is preferred to used a resin having a melt index (JIS K 6900) of 0.5-12, more preferably 1-10, since such a resin may be shaped into a uniform resin sheet by means of a T-die, and a pre-format may precisely be transferred to the resin by means of a pre-format roller.

In the present invention, specific examples of the pre-format pattern to be formed in the pre-format roller 5 may include: a pattern corresponding to a tracking groove in a spiral, concentric circle form for an optical disk, or in a parallel form for an optical card, which has a width of about 1-4 microns, a pitch of about 1-20 microns, and a depth of about 200-5,000 Å; a pattern corresponding to an address pit which has a width of about 0.6-10 micron, a pitch of about 0.6-20 microns, and a depth of about 200-5,000 Å; etc.

In the present invention, the melting point of a resin is a temperature corresponding to an endothermic peak which is obtained when powder of the resin is analyzed by means of a DTA (differential scanning calorimeter, trade name: TG/DTA 220, mfd. by Seiko Denshi Kogyo K. K.) at a temperature increasing rate of 20° C./min.

As described hereinabove, according to the present invention, (1) there is provided an optical recording medium substrate wherein irregularity in thickness, irregularity in shaping and optical anisotropy are reduced;

(2) there is provided an optical recording medium substrate to which a pre-format has been transferred precisely; and (3) there is provided at good productivity and low production cost by continuously or successively conducting a step of shaping a resin sheet and a step of transferring a pre-format to the resin sheet.

Further, according to the present invention, the pre-format of a pre-format roller or stamper, may be precisely transferred to a resin sheet so that a precision in angle as described hereinbelow is 7% or below, and a precision in depth as described hereinbelow is 2% or below, based on the shape of the pre-format pattern.

In addition, the present invention may provide a good precision in shaping irregularity as described hereinbelow of 10% or below, more preferably 5% or below, particularly 3% or below, based on the pre-format with respect to the direction of extrusion of the resin sheet. Further, the present invention may provide an optical recording medium substrate in a sheet form having a birefringence as described hereinbelow of ±100 nm or below corresponding to a single path, and particularly, irregularity in birefringence may be suppressed with respect to the width direction which is perpendicular to the extrusion direction of the resin sheet.

Hereinbelow, the present invention is described in more detail with reference to Examples.

EXAMPLE 1

An optical recording medium substrate was prepared in the following manner by using an extruder 1 having a diameter of 30 mm as shown in FIG. 1 equipped with a coat hanger-type die 2 having a width of 20 cm and being disposed downward (i.e., being disposed so as to extrude a resin sheet 8 downward).

The resin to be extruded was, a polycarbonate resin (trade name: AD 5503, mfd. by Teijin Kasei K. K.). The pressing roller 4 used herein was a roller with a mirror surface having a diameter of 200 mm and a length of 360 mm and comprised a steel roller coated with a 100 micron-thick Ni plating. Further, the pre-format roller 5 having a pre-format pattern had a diameter of 200 mm and a length of 360 mm.

Figure 8:
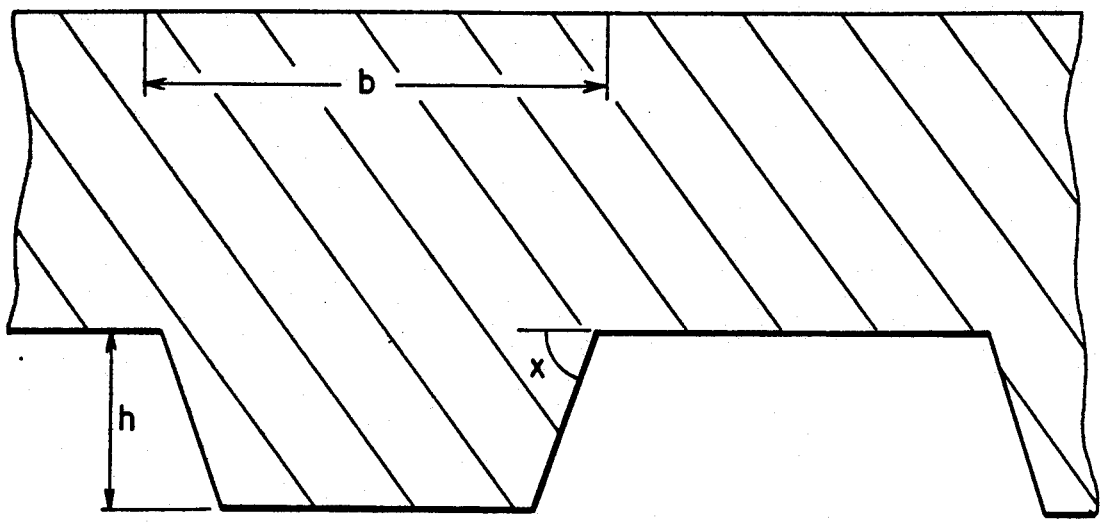
FIG. 8 is a schematic sectional view of the tracking groove pattern formed on a pre-format roller taken in a direction perpendicular to the longitudinal direction of the tracking groove pattern.

The pre-format roller 5 was provided with a pre-format pattern corresponding to a pre-format for an optical card having a length of 85 mm and a width of 54 mm, which comprises a pattern comprising tracking grooves and address pits which were provided in parallel with the axis of the roller 5. FIG. 8 shows a section of the above-mentioned pre-format pattern taken in a direction perpendicular to the longitudinal direction of the tracking groove pattern.

Referring to FIG. 8, the above-mentioned pre-format pattern comprised: 2583 parallel tracking groove patterns corresponding to tracking grooves having a width b of 3 microns, a height h of 2500 Å, an angle x of 60 degrees, a pitch of 12 microns, and a length of 85 mm; and address pit patterns (2583×4) corresponding to four address pits disposed in front of each tracking groove which had a width b of 3 microns, a length of 6 microns, a depth of 2500 Å, an angle x of 60 degrees and a pitch of 12 microns. Such a pre-format roller 5 was prepared by mirror-grinding the surface of a steel roller, coating the resultant surface with a 100 micron-thick nickel plating, and cutting it with a diamond cutting tool.

Referring to FIG. 1, the above-mentioned resin was extruded from the extruder 1 (overall length =1.20 m, mfd. by Thermoplastics K. K.) under extrusion conditions such that the temperature (Ta) of an a portion (disposed with a distance of 60 cm from the resin outlet) of the extruder barrel was 300° C., the temperature (Tb) of a b portion (disposed with a distance of 40 cm from the resin outlet) thereof was 300° C., and the temperature (Tc) of a c portion (disposed with a distance of 20 cm from the resin outlet) thereof was 320° C.; and the temperature (Td) of the T-die 2 was 320° C., whereby a sheet 8 of melted resin was prepared. The temperature of the resin immediately after the extrusion thereof from the T-die 2 was 280° C.-330° C. The pre-format roller 5 was kept at 180° C., and the roller 4 was kept at a temperature which was lower than the temperature of the pre-format roller by 1° C.-2° C.

The distance from the lip of the T-die 2 to the pressure shaping unit (i.e., the nip point 9 between the rollers 4 and 5) was 50 mm. The atmosphere around a portion extending from the extrusion point of the resin sheet 8 to the pressure-shaping point 9 thereof was kept at 60° C. or higher by surrounding such a portion with a heating chamber 7. The degree of the lip opening of the T-die 2 was 0.48 mm, and the gap between the rollers 4 and 5 constituting the pressure shaping unit 3 was 0.43 mm, whereby a 0.4 mm-thick optical recording medium substrate 8 in a sheet form provided with a pre-format was continuously shaped.

Figure 9:
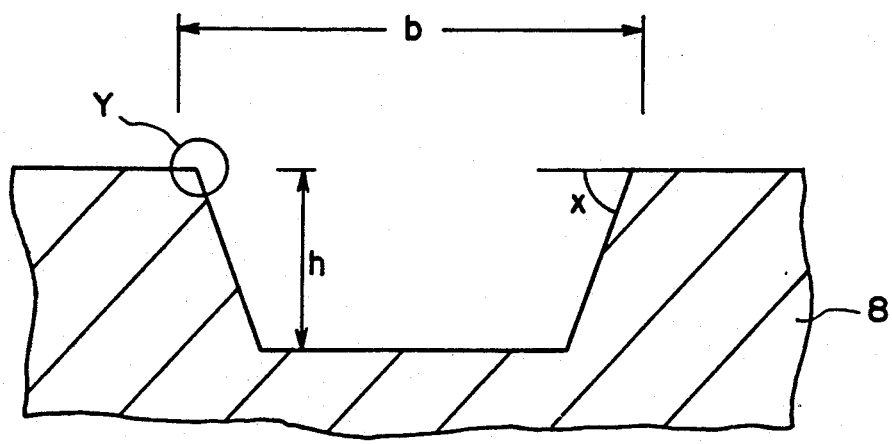
FIG. 9 is a schematic sectional view of the tracking groove formed on an optical recording medium substrate in a sheet form taken in a direction perpendicular to the longitudinal direction of the tracking groove.

The sectional shape of the thus obtained substrate sheet 8 for on optical card which was taken in the direction perpendicular to the direction of the tracking groove was observed with an electron-beam surface form analyzer, i.e., an analyzer utilizing a scanning electron microscope, (trade name: ESA-3000, mfd. by Elionix K. K.), whereby the depth (h) and angle (x) of the transferred pre-format as shown in FIG. 9 were measured. The thus obtained values of the depth and angle were compared with the corresponding values of the pre-format pattern of the pre-format roller 5 as shown in FIG. 8, whereby an error or tolerance was calculated. Further, with respect to the edge portion (Y) of the pre-format as shown in FIG. 9, there was observed whether the shape of the pre-format roller (or stamper) was precisely transferred to the resin sheet. Further, birefringence and shaping stability of the resin sheet 8 were measured. The birefringence was measured by using a polarimeter (Model: SP-224, mfd. by Shinko Seiki), with respect to the central portion of the resin sheet 8 and the portions disposed with a distance of 5 cm from both sides thereof.

The results are shown in Table appearing hereinafter.

EXAMPLE 2

Figure 2:
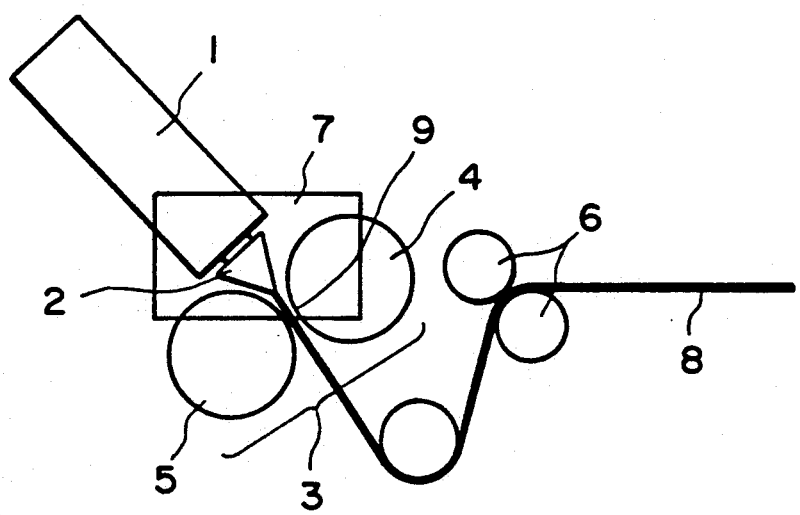

A 0.4 mm-thick optical recording medium the same manner as in Example 1 except for using an apparatus as shown in FIG. 2 wherein the T-die 2 was disposed so that the sheet 8 of a melted resin therefrom was extruded on a pre-format roller 5 having a pre-format pattern.

With respect to the thus obtained optical recording medium substrate sheet, the transfer precision of the pre-format and the birefringence were measured in the same manner as in Example 1.

The results are shown in Table appearing hereinafter.

EXAMPLE 3

A 0.4 mm-thick optical card substrate in a sheet form was continuously shaped in the same manner as in Example 1 except that the temperature of the pre-format roller 5 was 100° C.

The thus obtained substrate sheet was evaluated in the same manner as in Example 1.

The results are shown in Table appearing hereinafter.

EXAMPLE 4

An optical card substrate in a sheet form was shaped in the same manner as in Example 1 except that an extruder 1 having a diameter of 30 mm as shown in FIG. 3 equipped with a coat hanger-type die 2 having a width of 20 cm and being disposed horizontally (i.e., being disposed so as to extrude a resin sheet horizontally) was used, and the roller 6 was disposed so that the resin sheet 8 was caused to closely contact the peripheral surface of the pre-format roller 5 so as to provide an angle $\theta$ of 120 degrees as shown in FIG. 3. The extrusion conditions, the temperatures, diameters and materials of the pre-format roller 5 and mirror surface roller 4, etc. were the same as those in Example 1.

With respect to the thus obtained optical card substrate sheet, the transfer precision of the pre-format and the birefringence were measured in the same manner as in Example 1.

The result are shown in Table appearing hereinafter.

EXAMPLE 5

An optical card substrate in a sheet form was shaped in the same manner as in Example 4 except that the resin sheet 8 was caused to closely contact the peripheral surface of the pre-format roller 5 so as to provide an angle $\theta$ of 70 degrees. The thus obtained substrate sheet was evaluated in the same manner as in Example 4.

The results are shown in Table appearing hereinafter.

EXAMPLE 6

An optical card substrate in a sheet form was shaped in the same manner as in Example 4 except that the resin sheet 8 was caused to closely contact the peripheral surface of the pre-format roller 5 so as to provide an angle $\theta$ of 60 degrees. The thus obtained substrate sheet was evaluated in the same manner as in Example 4.

The results are shown in Table appearing hereinafter.

EXAMPLE 7

An optical card substrate in a sheet form was shaped in the same manner as in Example 3 except that the resin sheet 8 was caused to closely contact the peripheral surface of the pre-format roller 5 so as to provide an angle θ of 120 degrees, and the temperature of the pre-format roller 5 was 140° C. The thus obtained substrate sheet was evaluated in the same manner as in Example 3.

The results are shown in Table appearing hereinafter.

EXAMPLE 8

An optical recording medium ,substrate was prepared in the following manner by using an extruder 1 having a diameter of 30 mm as shown in FIG. 6 equipped with a coat hanger-type die 2 having a width of 20 cm and being disposed downward (i.e., being disposed so as to extrude a resin sheet 8 downward).

In the apparatus as shown in FIG. 6, the resin sheet 8 was caused to closely contact the peripheral surface of the pre-format roller 5 so as to provide an angle θ of 100 degrees, and three hot-air blowers 11 were disposed so as to heat-treat the resin sheet 8 closely contacting the pre-format roller 5. The roller 4 used herein was a roller with a mirror surface having a diameter to 200 mm and a length of 360 mm. Further, the pre-format roller 5 having a pre-format pattern had a diameter of 200 mm and a length of 360 mm.

The pre-format roller 5 was provided with a pre-format pattern corresponding to a pre-format for an optical card having a length of 85 mm and a width of 54 mm, which comprised a pattern comprising tracking grooves and address pits which was provided in a direction perpendicular to the axis of the roller 5. Referring to FIG. 8, the above-mentioned pre-format pattern comprised: 2583 parallel tracking groove patterns corresponding to tracking grooves having a width b of 3 microns, a height h of 2500 Å, an angle x of 60 degrees, a pitch of 12 microns, and a length of 85 mm; and address pit patterns (2583×4) corresponding to four address pits disposed in front of each tracking groove which had a width b of 3 microns, a length of 6 microns, a depth of 2500 Å, an angle x of 60 degrees and a pitch of 12 microns. Such a pre-format roller 5 was prepared by mirror-grinding the surface of a steel roller, coating the resultant surface with a 100 micron-thick nickel plating, and cutting it with a diamond cutting tool.

Referring to FIG. 6, the same resin used in Example 1 was extruded from the extruder 1 under extrusion conditions such that the temperature (Ta) of an a portion of the extruder barrel was 300° C., the temperature (Tb) of a h portion thereof was 300° C., and the temperature (Tc) of a c portion thereof was 320° C.; and the temperature (Td) of the T-die 2 was 320° C., whereby a sheet 8 of melted resin was prepared. The temperature of the resin immediately after the extrusion thereof from the T-die 2 was 280° C.-330° C. The pre-format roller 5 was kept at 180° C., and the roller 4 was kept at a temperature which was lower than the temperature of the pre-form at roller by 1° C.-2° C.

The distance from the lip of the T-die 2 to the pressure shaping point (i.e., the nip point 9 between the rollers 4 and 5) was 50 mm. The atmosphere around a portion extending from the extrusion point of the resin sheet to the pressure-shaping point 9 thereof was kept at 60° C. or higher by surrounding such a portion with a heating chamber 7. The degree of the lip opening of the T-die 2 was 0.48 mm, and the gap between the rollers 4 and 5 constituting the pressure shaping unit 3 was 0.43 mm, whereby a 0.4 mm-thick optical recording medium substrate 8 in a sheet form provided with a pre-format was continuously shaped.

In this instance, the temperature of the sheet 8 of the melted resin closely contacting the roller 5 was lowered thereon corresponding to the ambient temperature of the atmosphere surrounding it, and the sheet 8 was hardened or solidified and wound as a sheet form. The cooling rate was controlled by using hot air so that the resin sheet was cooled from the melted state to the glass transition point of the polycarbonate (140° C.) at about 3° C./sec or below, whereby a sheet having a pre-format was shaped. The temperature of the hot air from the blower 11 was so controlled that the cooling rate of the resin sheet 8 was 3° C./sec or below while measuring the temperature of the resin sheet 8 by means of an infrared thermometer (trade name: DHS-8x, mfd. by Daiichi Kagaku).

EXAMPLE 9

An optical card substrate in a sheet form was shaped in the same manner as in Example 8 except that the resin sheet 8 was caused to closely contact the peripheral surface of the pre-format roller 5 so as to provide an angle θ of 90 degrees; the temperature of the pre-format roller 5 was kept at 210° C.; the mirror surface roller 4 was heat at 208° C.-209° C.; and the cooling rate was 5° C./sec. The thus obtained substrate sheet was evaluated in the same manner as in Example 1.

The results are shown in Table appearing hereinafter.

EXAMPLE 10

An optical card substrate was prepared in the following manner by using an extruder 1 as shown in FIG. 7.

In the apparatus as shown in FIG. 7, the resin sheet 8 was caused to closely contact the peripheral surface of the pre-format roller 5 so as to provide an angle θ of 200 degrees, and nine infrared lamps 12 were disposed around the peripheral surface of the roller 5 so as to heat-treat the resin sheet 8 closely contacting the pre-format roller 5. The roller 4 used herein was a roller with a mirror surface having a diameter to 100 mm and a length of 360 mm. Further, the pre-format roller 5 having a pre-format pattern had a diameter of 400 mm and a length of 360 mm.

Referring to FIG. 7, the temperature of the pre-format roller 5 was 210° C. and the temperature of the roller 4 was 207° C.-209° C. The resin sheet 8 was heat-treated while controlling the cooling, rate thereof so that the resin sheet 8 was cooled from the melted state to the glass transition point of the polycarbonate at cooling rate of about 2° C./sec or below.

An optical recording medium sheet in a sheet form was prepared in the same manner as in Example 8 except that the above-mentioned conditions were used. The thus obtained substrate sheet was evaluated in the same manner as in Example 8.

The results are shown in Table appearing hereinafter.

| Example | Transfer precision | | | | Birefringence | |
|---|---|---|---|---|---|---|
| | Shaping stability | Shape of edge (y) | Angle (x) | Depth (h) | End portion | Central portion |
| 1 | c | not clear | b | c | e | e |
| 2 | c | not clear | b | c | e | e |
| 3 | c | not clear | c | c | d | c |
| 4 | a | clear | a | a | d | b |
| 5 | a | clear | a | a | d | b |
| 6 | b | not clear | b | b | e | c |
| 7 | a | not clear | b | b | d | b |
| 8 | a | clear | a | a | b | b |

-continued

| Example | Transfer precision | | | | Birefringence | |
|---|---|---|---|---|---|---|
| | Shaping stability | Shape of edge (y) | Angle (x) | Depth (h) | End portion | Central portion |
| 9 | a | clear | a | a | b | a |
| 10 | a | clear | a | a | a | a |

The above-mentioned respective items were evaluated in the following manner.

Shaping stability

With respect to one tracking groove formed on the substrate sheet for an optical card having a length of 1 m, the depths of ten points of the groove were measured at intervals of 10 cm. By using the resultant maximum (Dmax) and minimum (Dmin) values, the degrees of variation were calculated according to the following formula and were averaged:

Degree of variation = $[(Dmax-Dmin)/Dmax] \times 100$.

| Evaluation | Degree of variation |
|---|---|
| a | 3% or smaller, |
| b | 5% or smaller and larger than 3%, and |
| c | 10% or smaller and larger than 5%. |

Edge shape

The substrate was observed with an electron-beam surface form analyzer utilizing a scanning electron microscope (magnification: 3000) to obtain an unevenness profile which was then observed with the eyes.

Angle x

The angle x of the pre-format pattern (FIG. 8) of a pre-format roller (Xr) and the angle x of the pre-format (FIG. 9) of the resultant substrate (Xs) were measured and the precision in angle was calculated according to the following formula:

Precision in angle = $[(Xr-Xs)/Xr] \times 100$

| Evaluation | Precision in angle |
|---|---|
| a | 1% or smaller, |
| b | 4% or smaller and larger than 1%, and |
| c | 7% or smaller and larger than 4%. |

When the shape of the edge portion (Y) was not clear, the angle x was obtained by extrapolation.

Depth

The height h of the pre-format pattern (FIG. 8) of a pre-format roller (Hr) and the depth h of the pre-format (FIG. 9) of the resultant substrate (Ds) were measured and the precision in depth was calculated according to the following formula:

Precision in angle = $[(Hr-Ds)/Hr] \times 100$

| Evaluation | Precision in Depth |
|---|---|
| a | 0.05% or smaller, |
| b | 0.5% or smaller and larger than 0.05%, and |
| c | 2.0% or smaller and larger than 0.5%. |

Birefringence

The birefringence of the substrate was measured by using a polarimeter (Model: SP-224, mfd. by Shinko Seiki) by using a semiconductor laser of 830 nm corresponding to a single path.

| Evaluation | Birefringence |
|---|---|
| a | 10 nm or smaller, |
| b | 20 nm or smaller and larger than 10 nm, |
| c | 35 nm or smaller and larger than 20 nm, |
| d | 50 nm or smaller and larger than 35 nm, and |
| e | 100 nm or smaller and larger than 50 nm. |

What is claimed is:

1. A process for producing an optical recording medium substrate in a sheet form, comprising the steps of:
   melt-extruding a resin to form a resin sheet; and
   passing under pressure the resin sheet in a substantially melted state between a first heated roller having an axis and having a peripheral surface provided with a predetermined unevenness pattern and a second heated roller disposed opposite thereto, thereby to transfer the unevenness pattern to a surface of the resin sheet; wherein
   the first roller is heated to have a surface temperature higher than the glass transition point of the resin; and
   the resin sheet after passing the first and second heated rollers is gradually cooled to the glass transition point of the resin at a cooling rate of at most 5° C./sec while it is caused to be in continuous close contact with the peripheral surface of the first roller.

2. A process according to claim 1, wherein the first roller is heated up to a temperature between the melting point of the resin and 40° C. below the melting point.

3. A process according to claim 2, wherein the first roller is heated up to a temperature between the melting point of the resin and 20° C. below the melting point.

4. A process according to claim 1, wherein the resin sheet is continuously caused to closely contact a portion of the peripheral surface of the first roller so as to provide an angle θ of at least 70 degrees wherein the angle θ is one formed by a line joining the axis of the first roller and a nip point between the first and second rollers, and a line joining the axis of the first roller and a peeling point at which the resin sheet is peeled from the first roller.

5. A process according to claim 4, wherein the resin sheet is continuously caused to closely contact a portion of the peripheral surface of the first roller so as to provide an angle θ of at least 90 degrees.

6. A process according to claim 1, wherein the resin sheet disposed on the first roller is cooled at a cooling rate of at most 3° C./sec.

7. A process according to claim 1, wherein the resin comprises a polycarbonate resin.

* * * * *

UNITED STATES PATENT AND TRADEMARK OFFICE
CERTIFICATE OF CORRECTION

PATENT NO. : 5,075,060
DATED : December 24, 1991
INVENTOR(S) : HIROYUKI IMATAKI

It is certified that error appears in the above-identified patent and that said Letters Patent is hereby corrected as shown below:

On the Title page, item [75] INVENTOR

"Tokyo," should read --Kawasaki,--.

item [30] FOREIGN APPLICATION PRIORITY DATA

"63-138814" should read --1-138814--.

item [56] REFERENCES CITED

Under U.S. PATENT DOCUMENTS, insert:

-- 4,876,042   10/1989   Imataki et al.  ..... 264/1.3 X
   4,871,649   10/1989   Imataki et al.  ..... 430/270 --.

Under FOREIGN PATENT DOCUMENTS, insert:

-- 62-140817   6/1987   Japan .
   56-86721    7/1981   Japan .
   63-20694    1/1988   Japan . --.

COLUMN 1

Line 50, "stability," should read --stability)--.

COLUMN 2

Line 52, "contact" should read --contacts--.

COLUMN 4

Line 23, "around," should read --around--.
Line 30, "resin sheet 9" should read --resin sheet 8--.

UNITED STATES PATENT AND TRADEMARK OFFICE
CERTIFICATE OF CORRECTION

PATENT NO. : 5,075,060
DATED : December 24, 1991
INVENTOR(S) : HIROYUKI IMATAKI

It is certified that error appears in the above-identified patent and that said Letters Patent is hereby corrected as shown below:

COLUMN 5

Line 45, "roller 5," should read --roller 5)-- and ""θ")," should read --"θ",--.

COLUMN 6

Line 15, "In" should read --From--.

COLUMN 7

Line 22, "views" should read --view--.
    Line 61, "used" should read --use--.

COLUMN 8

Line 56, "was," should read --was--.

COLUMN 9

Line 50, "on" should read --an--.

COLUMN 10

Line 6, "medium the" should read --medium substrate in sheet form was continuously shaped in the--.

COLUMN 11

Line 9, ",substrate" should read --substrate--.
    Line 56, "pre-form at roller" should read --pre-format roller--.

UNITED STATES PATENT AND TRADEMARK OFFICE
CERTIFICATE OF CORRECTION

PATENT NO. : 5,075,060
DATED : December 24, 1991
INVENTOR(S) : HIROYUKI IMATAKI

It is certified that error appears in the above-identified patent and that said Letters Patent is hereby corrected as shown below:

COLUMN 12

Line 24, "heat" should read --kept--.
Line 46, "cooling," should read --cooling--.

COLUMN 14

Line 51, "70 degrees" should read --70 degrees,--.

Signed and Sealed this

Twenty-fifth Day of May, 1993

Attest:

MICHAEL K. KIRK

*Attesting Officer*   *Acting Commissioner of Patents and Trademarks*